Jan. 29, 1924.
W. H. HODGSON
HANDLE
Filed Jan. 27, 1922
1,482,305
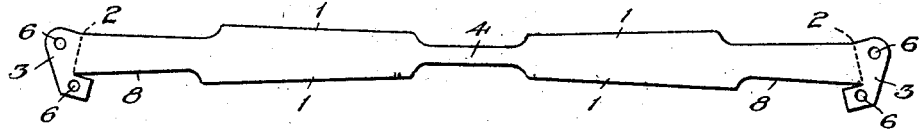
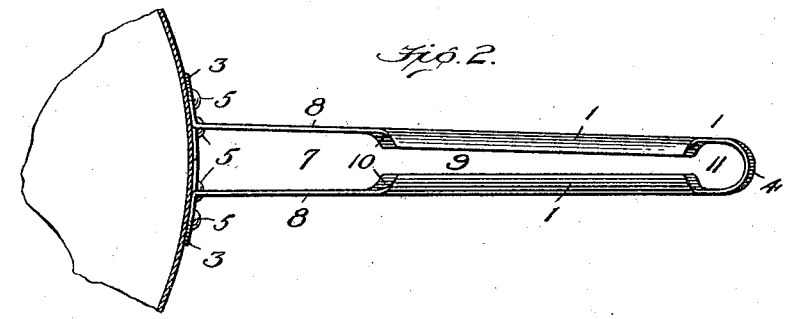
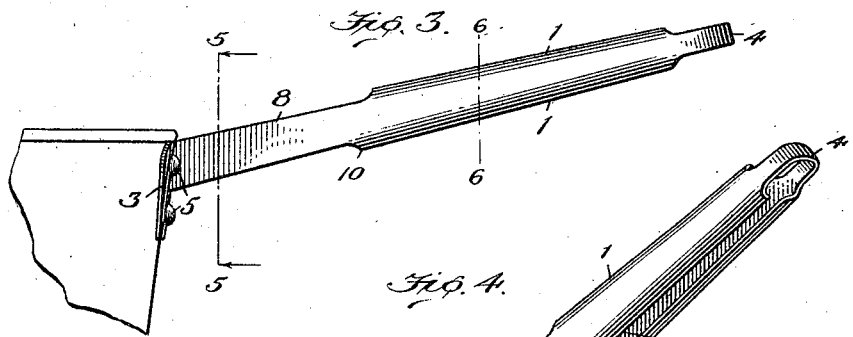
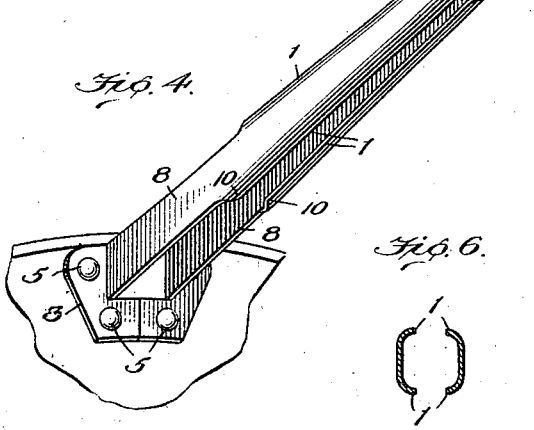
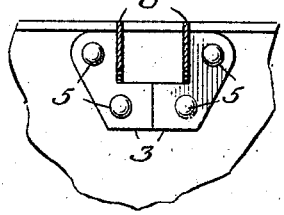
Inventor
William H. Hodgson,
By Wm E Dyre
Attorney
Witness
Edwin L. Bradford Patented Jan. 29, 1924.

1,482,305

UNITED STATES PATENT OFFICE.

WILLIAM H. HODGSON, OF ROCKVILLE, CONNECTICUT.

HANDLE.

Application filed January 27, 1922. Serial No. 532,170.

*To all whom it may concern:*

Be it known that I, WILLIAM H. HODGSON, a citizen of the United States, residing at Rockville, in the county of Tolland and State of Connecticut, have invented certain new and useful Improvements in Handles; and I do hereby declare the following to be a full, clear, and exact description of the invention, such as will enable others skilled in the art to which it appertains to make and use the same.

My invention consists of an improved handle for a cooking utensil, the principal object of which is to provide a handle which will remain cool when the vessel to which it is attached is used to heat or boil its contents, and is particularly adapted for a sauce pan to be used over the flame of a gas stove or oil stove where the flame or excessive heat rises immediately around the pan.

Another object is to provide a handle that will be firm and rigid.

Another object is to provide a handle that will collect the smallest possible amount of heat rising around the pan when the pan or vessel is used to boil or heat its contents.

Another object is to provide a handle that is sanitary and can be kept in a clean condition.

Another object is to provide a simple and inexpensive handle, very easily constructed from a single piece of suitable sheet metal stamped and formed to the required size and shape.

With the foregoing and other objects in view which will appear as the description proceeds, the invention resides in the shape and construction of the handle as hereinafter described and claimed, it being understood that changes in precise embodiment of the invention herein disclosed can be made within the scope of what is claimed, without departing from the spirit of the invention.

In the accompanying drawings:

Fig. 1 shows the approximate shape of a strip of metal stamped out to form the handle as described;

Fig. 2 shows a plan of the handle and fragment of a cooking utensil to which it is attached;

Fig. 3 shows a side elevation of parts illustrated by Fig. 2;

Fig. 4 is a perspective view of the invention;

Fig. 5 is a sectional view taken on the line 5—5 of Fig. 3; and

Fig. 6 is also a sectional view taken on the line 6—6 of Fig. 3.

Referring to the drawings, it will be readily seen that the handle is constructed from a single piece of or strip of suitable sheet metal, stamped out approximately as shown in Fig. 1. This being a single piece is a simple and inexpensive form.

The next process in forming the handle is to bend over or roll upon itself the portions of the handle indicated by numerals 1. This may be done at the same time that the metal shape is stamped out.

The next process step is to bend over, approximately at right angles, along the dotted lines 2, the ends 3, which form the support by which the handle is attached to the pan.

The next process step is to bend over the handle in the center as shown by numeral 4.

This gives the completed handle ready to be attached to the pan by rivets as shown by numerals 5, passed through the holes shown at 6 which may be punched out in the first process when the handle is stamped out. It may, if desired, be attached by brazing or other suitable means.

This gives a very simple, inexpensive and convenient form of handle which is easy to grasp, being rounded into a tubular form at the upper portion of the handle which is grasped by the hand as shown by numeral 1, and as shown more clearly in Fig. 6.

The handle being spaced as shown by numeral 7 near the pan, allows the flame or hot air rising around the pan to pass through between the sides of the handle indicated by the numeral 8, allowing only the thickness of the metal to resist the flame or uprising heat, and in this way the least resistance is offered by the handle to the uprising heat which does not collect in the handle and cannot pass up into the tubular portion 1.

This tubular portion is also divided along its entire length as shown by the space 9 between the two sides, so that any hot air immediately escapes from the tubular portion allowing a current of cool air to come up to replace the escaping hot air which rises and so keeps the handle cool and easy to grasp without burning the hands.

It is also advisable to have the tubular portion of the handle cut away further from the pan on the upper half as shown by numeral 10, so that it will not deflect the uprising heat into the tubular portion of the handle.

The curved or tubular portion of the handle 1 being removed at the end of the handle as shown by numeral 11 allows of its being hung on a convenient hook or nail.

With the handle of this form, no dirt or food can collect in or on the handle near the pan and it can be kept in a clean sanitary condition.

Having thus described my invention what I claim and desire to protect by Letters Patent is:

1. A handle particularly adapted for cooking utensils and including two substantially parallel side members integrally connected together at their outer ends, the opposite end portion of each of said side members being in a vertical plane and the vertical plane portions being unconnected and spaced apart throughout substantially their entire length to permit the passage of air between the same, the portion of each of said side members between the vertical plane portion and the end which is connected to the other side member being substantially channel-shaped in cross section, the mouths of the channels of the side members opening opposite each other and the channel-shaped portions being spaced apart throughout substantially their entire length to permit the circulation of air between the same, the vertical plane portion of each side member being provided at one end with an integral angularly extending wing provided with an extension, the extensions of the wings of the side members abutting against each other.

2. A handle particularly adapted for cooking utensils and including two substantially parallel side members connected together at one end, the opposite end portion of each of said side members being in a vertical plane and the vertical plane portions being unconnected and spaced apart through substantially their entire length to permit the passage of air between the same, the portion of each of said side members between the vertical plane portion and the end which is connected to the other side member being substantially channel-shaped in cross section, the mouths of the channels of the side members opening opposite each other and the channel-shaped portions being spaced apart substantially their entire length to permit the circulation of air between the same, the ends of the channel-shaped portions being beveled and the lower flanges of the channel-shaped portions extending at least to a point in a vertical line with the upper flanges of the channel-shaped portions.

3. A handle consisting of a single piece of sheet metal bent intermediate its ends to provide opposite side members, the bended portion of said sheet metal piece being of reduced height to facilitate bending, the extremities of said side members being bent at angles relatively to the portions of the side members adjacent to said extremities, said last mentioned portions being spaced apart, arranged in substantially vertical parallel planes and being unconnected, the portions of said side members between the vertical plane portions and the portion of reduced height being of channel-shaped cross section with the channels opening toward one another, said channel-shaped portions being spaced apart throughout substantially their entire length and said space being unobstructed in order to permit the circulation of air between the channel-shaped portions of said side members.

In testimony whereof I affix my signature, in presence of two subscribing witnesses.

WILLIAM H. HODGSON.

Witnesses:
HAROLD R. OBENAUF,
KIRK M. WOOD.